(12) United States Patent
Boutin

(10) Patent No.: US 8,638,206 B2
(45) Date of Patent: Jan. 28, 2014

(54) METHOD OF DISPLAYING A POINTER ON A DISPLAY AREA OF A VEHICLE INSTRUMENT PANEL

(75) Inventor: Tony Boutin, Osny (FR)

(73) Assignee: Johnson Controls Technology Company, Plymouth, MI (US)

( * ) Notice: Subject to any disclaimer, the term of this patent is extended or adjusted under 35 U.S.C. 154(b) by 515 days.

(21) Appl. No.: 12/665,677

(22) PCT Filed: Jun. 11, 2008

(86) PCT No.: PCT/EP2008/004661
§ 371 (c)(1),
(2), (4) Date: Jun. 10, 2010

(87) PCT Pub. No.: WO2008/155052
PCT Pub. Date: Dec. 24, 2008

(65) Prior Publication Data
US 2010/0283592 A1    Nov. 11, 2010

(30) Foreign Application Priority Data

Jun. 20, 2007 (DE) .......................... 10 2007 029 054

(51) Int. Cl.
*B60Q 1/00* (2006.01)
(52) U.S. Cl.
USPC .......... 340/438; 340/425.5; 715/700; 345/86; 362/23.01
(58) Field of Classification Search
USPC ............. 340/438, 425.5; 345/84, 86, 87, 156; 368/228, 229; 715/700, 859, 861; 362/23.01, 23.11
See application file for complete search history.

(56) References Cited

U.S. PATENT DOCUMENTS

| | | | | |
|---|---|---|---|---|
| 5,523,922 A * | 6/1996 | Kato | | 362/23 |
| 5,949,346 A * | 9/1999 | Suzuki et al. | | 340/815.45 |
| 6,714,126 B2 * | 3/2004 | Wada | | 340/438 |
| 6,836,713 B2 * | 12/2004 | Hayashi et al. | | 701/36 |
| 7,262,689 B2 * | 8/2007 | Kolpasky | | 340/461 |

(Continued)

FOREIGN PATENT DOCUMENTS

| DE | 100 08211 A1 | 8/2001 |
|---|---|---|
| DE | 101 09 905 A1 | 8/2002 |
| DE | 102005015178 A1 | 10/2006 |
| FR | 2869139 A | 10/2005 |

OTHER PUBLICATIONS

International Search Report corresponding to PCT/EP2008/004661, dated Jul. 10, 2008, 2 pages.

*Primary Examiner* — George Bugg
*Assistant Examiner* — Edny Labbees
(74) *Attorney, Agent, or Firm* — Foley & Lardner LLP

(57) ABSTRACT

The invention relates to a method for displaying a pointer on a display surface of a vehicle instrument panel, wherein:
- a first position (P1) of the pointer on the display surface (1) is computed according to a first measurement carried out by a sensor of the vehicle;
- the pointer (21) is displayed on the display surface (1) at said first position (P1);
- a second position (P2) of the pointer on the display surface (1) is computed according to a second measurement carried out by said sensor of the vehicle;
- the pointer (22) is displayed on the display surface (1) at said second position (P2);

the method being characterized in that at least one of the physical characteristics of the pointer (22), displayed at said second position (P2), is modified according to the deviation between the first and second computed positions.

7 Claims, 4 Drawing Sheets

(56) References Cited

U.S. PATENT DOCUMENTS

| | | | |
|---|---|---|---|
| 7,369,044 B2 * | 5/2008 | Ono et al. | 340/461 |
| 7,675,404 B2 * | 3/2010 | Kanzaka | 340/441 |
| 8,160,298 B2 * | 4/2012 | Okumura et al. | 382/103 |
| 2005/0280521 A1 * | 12/2005 | Mizumaki | 340/438 |
| 2007/0285388 A1 * | 12/2007 | Ogasawara | 345/157 |

* cited by examiner

METHOD OF DISPLAYING A POINTER ON A DISPLAY AREA OF A VEHICLE INSTRUMENT PANEL

CROSS-REFERENCE TO RELATED APPLICATIONS

This application is a National Stage application of PCT/EP2008/004661, filed Jun. 11, 2008, which claims the benefit and priority of German Patent Application 10 2007 029 054.5 filed Jun. 20, 2007. The foregoing applications are incorporated by reference herein in their entirety.

The invention relates to the field of vehicle instrument panel indicators.

In an automotive vehicle, the instrument panel gathers the various instruments required for navigation and conventionally includes mechanical indicators such as movements, for indicating the speed of the vehicle, the rotation speed of the engine or the percentage of fuel left in the tank.

The current trend aims at substituting for conventional mechanical indicators digital indicators with a LCD or TFT-type display screen. Digital indicators can advantageously be easily configured according to the various vehicle ranges. As such, in order to configure a digital indicator, a single software setting is required, since the electronic components remain the same.

In spite of all the advantages provided by digital indicators, reproducing the mechanical indicators behaviour is impossible. In particular, traditional speed indicators, that is to say with a pointer mounted on a pivot located at the centre of a dial, are not depicted satisfactorily.

Upon accelerating or decelerating the vehicle, it is required to change the position of the pointer of the indicator, whether mechanical or digital, so that the pointer always indicates the graduation mark corresponding to the value of the vehicle speed. This modification of the indicator is carried out in real time for a traditional mechanical indicator, and then the driver feels like controlling his/her vehicle.

With digital indicators, the display screen refreshing frequency, conventionally between 50 and 60 Hz, can not display continuously and smoothly the pointer movement. The jerk movement of the indicator pointer can be perceived with the naked eye by the driver, which is a source of dissatisfaction, but above all prevents the driver from perceiving a change.

In order to overcome these drawbacks, the Applicant provides a method for displaying a pointer on a display surface of a vehicle instrument panel, wherein:

a first position (P1) of the pointer on the display surface is computed according to a first measurement carried out by a sensor in the vehicle;

the pointer is displayed on the display surface at said position (P1);

a second position (P2) of the pointer on the display surface is computed according to a second measurement carried out by said sensor in the vehicle;

the pointer is displayed on the display surface at said second position (P2);

the method being characterised in that at least one of the physical characteristics of the pointer, displayed at said second position (P2), is modified according to the deviation ($\Delta P$) between the first and second computed positions.

Such a method allows the driver to perceive the change in the pointer position smoothly. What is meant by physical characteristics of the pointer encompasses the shape, colour, transparency, blurred rendering, contrast, brightness, etc.

Preferably, the thickness of the pointer is increased according to the deviation ($\Delta P$) between the first and second computed positions.

The movement of the pointer between the first and second positions is then seen continuously with the naked eye.

According to another feature of the invention, the transparency of the pointer, displayed at said second position, is increased according to the deviation ($\Delta P$) between the first and second computed positions.

According to another feature of the invention, the outlines of the pointer, displayed at said second position (P2), are made blurred according to the deviation ($\Delta P$) between the first and second computed positions.

Preferably, the pointer is simultaneously displayed at the first and second positions.

Further preferably, the pointer displayed at the first position is more transparent than the pointer displayed at the second position.

Still preferably, the physical characteristics of the pointer are modified in a consistent way.

The invention will be better understood with the appended drawings wherein.

Figure 1:
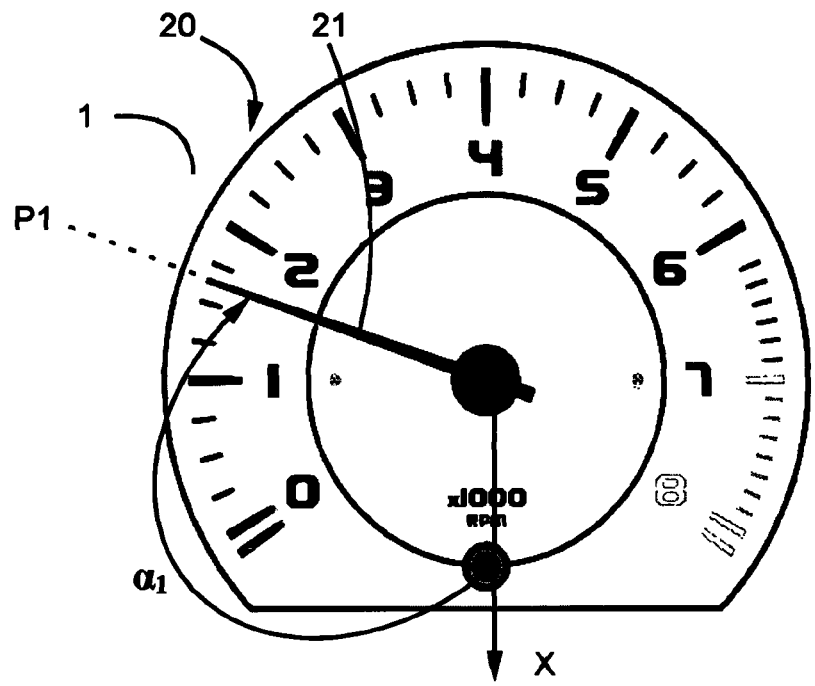
FIG. 1 shows a first position of the pointer (P1) on a display screen of a first embodiment of a speed indicator.

Referring to FIG. 1, a circular dial 20 for displaying the rotation speed of an engine is displayed on a display screen 1 of a first embodiment of an automotive vehicle instrument panel indicator. The pointer 21 is displayed on the screen 1 and indicates a graduation mark of the dial 20.

The invention is described herein for an indicator of the rotation speed of the engine mounted to the instrument panel of the vehicle. The instrument panel is herein defined in a broad sense and includes indicators located on the dashboard, traditionally mounted behind the steering wheel, as well as indicators located in the centre part of the vehicle, with the car radio, or near the front or rear passengers.

An engine speed sensor, located in the vehicle engine, measures the rotation of the latter (number of revolutions per minute). Measurements are carried out at regular time periods and are transmitted to an onboard computer which determines the display position of the pointer 21 on the dial 20 according to the measurement of the sensor.

Referring to FIG. 1, further to a first measurement carried out by the sensor (1600 rpm), the pointer 21 is displayed at a first position P1 on the dial 20. The pointer 21 provides an angle $\alpha_1$ of 110° with respect to an axis X from the centre of the dial towards the bottom, the angle being positive clockwise.

For the sake of clarity, different references will be used in the following description in order to indicate the display of the pointer at each position (P1, P2, P3).

Figure 2:
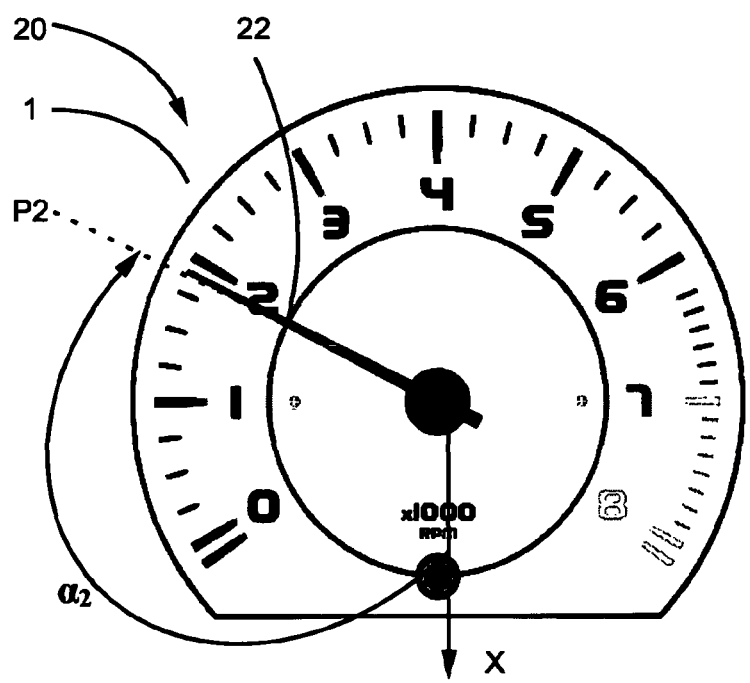
FIG. 2 shows a second position of the pointer (P2) of the indicator of FIG. 1.

Referring to FIG. 2, further to a second measurement carried out by the sensor (1900 rpm), the pointer is displayed at a second position P2 on the dial 10. The pointer 22, that is to say the display of the pointer at position P2, provides an angle $\alpha_2$ of 120° with respect to the axis X.

When pointers 21, 22 are successively displayed on the dial 20, after two successive measurements of the sensor, a deviation ΔP is observed between both ends of the pointers, which can be seen with the naked eye. The driver of the vehicle perceives a jerk movement of the pointer.

A rotation of the pointer in the dial of 520° per second, with a refreshing rate of the display screen of 60 Hz (that is to say one new displayed image every 16 ms), leads to an angular deviation in the order of 8.7° between two successive displays of the pointer. Therefore, for a 7 cm long pointer, the distance between two successive positions of the pointer is in the order of one centimeter.

Figure 3:
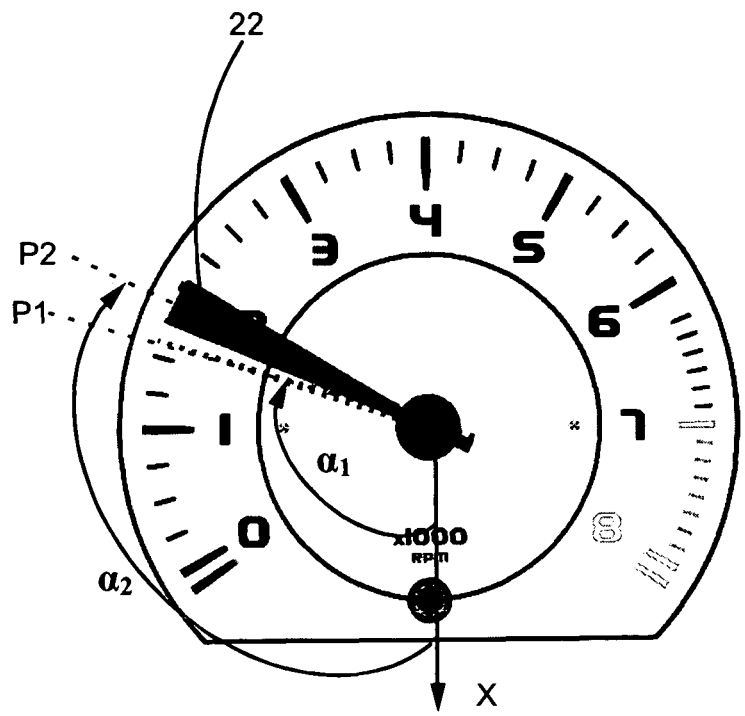
FIG. 3 shows, on the indicator of FIG. 1, the display of the pointer movement from the first to the second position according to a first implementation of the method of the invention.

In order to overcome this drawback, referring to FIG. 3, the pointer 21 is first displayed on the display surface at said first position P1 computed with the first measurement carried out by the sensor. Upon displaying the pointer 22 at position P2, computed with the second measurement carried out by the sensor, the thickness of the pointer 22 is increased according to the deviation ΔP between the first and second positions, preferably proportionally.

Figure 4:
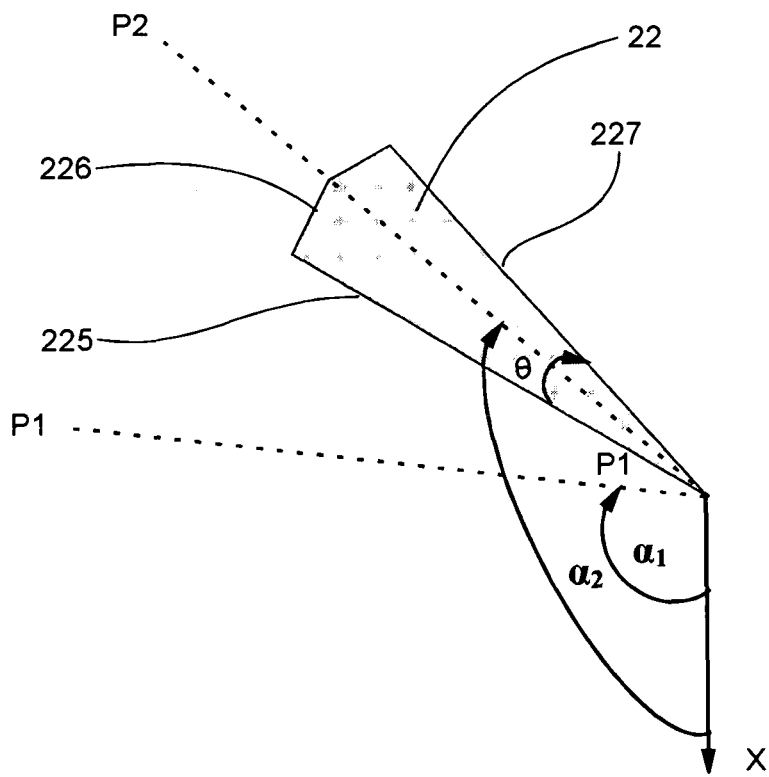
FIG. 4 is a schematic representation of the pointer displayed at the second position (P2)

Referring to FIG. 4, the thickness of the pointer 22 is here a radial thickness of an angle θ. The value of the angle θ is computed according to the deviation ΔP between positions P1 and P2 so that the pointer 22, displayed at position P2 is sufficiently thin not to cover the pointer 21, previously displayed at position P1, and sufficiently wide to ensure visual smoothness of the display of the pointer between the two successive positions P1 and P2. Generally, the angle θ is smaller than the deviation $\Delta P = (a_2 - a_1)$.

Still referring to FIG. 4, the thickened pointer 22 is shown in the form of a disc sector outlined by a lower segment 225, an arc of circle 226 and an upper segment 227, the lower segment 225 being located before the upper segment 227, clockwise of the dial 20 from the oriented axis X. Of course, the upper 227 and lower 225 segments can also be connected with a segment of any other geometrical curve.

Referring to FIGS. 3 and 4, in a first implementation of the method of the invention, the pointer 22 is centred on position P2. In other words, the line, crossing the centre of the dial and indicating the position P2 (120°), is in line with the upper segment 227 of the pointer 22 with a viewing angle θ=5°. The pointer 22 indicates the graduation marks of 1750 rpm to 2000 rpm.

Figure 5:
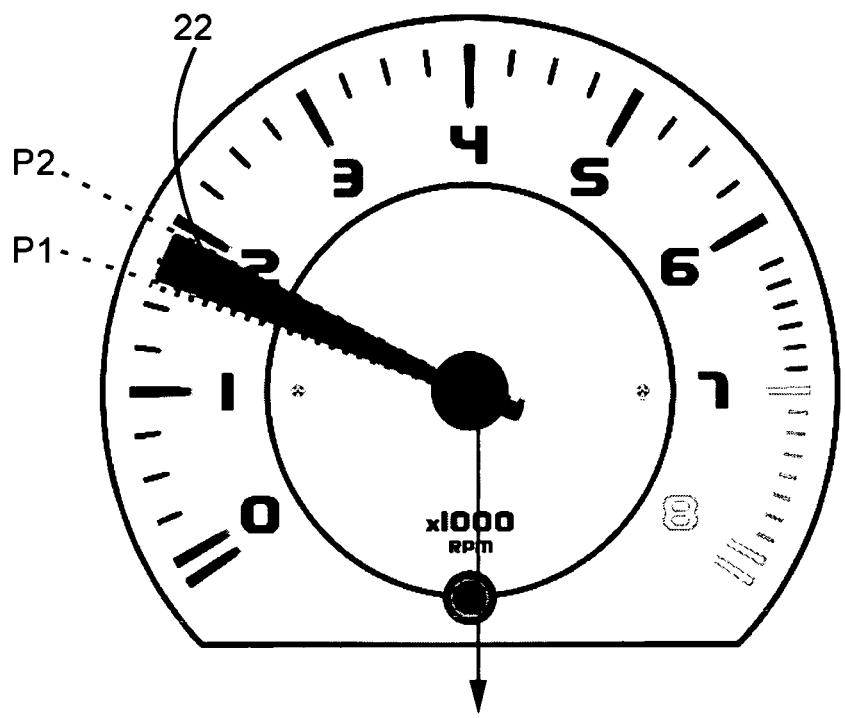
FIG. 5 shows a second implementation of the method of the invention with a thicker pointer in line with the second position (P2)

In a second implementation of the method of the invention, referring to FIG. 5, the pointer 22 is in line with position P2. That is to say the line crossing the centre of the dial and indicating position P2 (120°) is in line with the upper segment 227 of the pointer 22 with a viewing angle θ=5°. The pointer 22 indicates the graduation marks 1650 rpm to 1900 rpm.

The display of a thicker pointer can make the pointer movement smoother. For the driver, the pointer seems to move continuously between the first and second positions.

Figure 6:
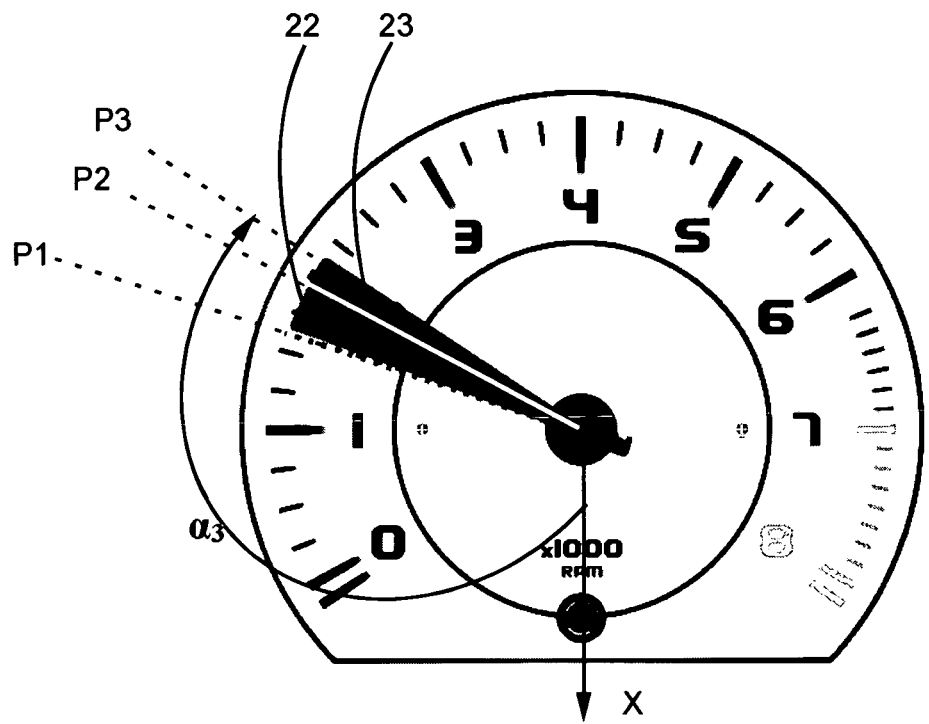
FIG. 6 shows the pointer simultaneously displayed at the second and third positions according to a third implementation of the method of the invention.

In a third implementation of the method of the invention, referring to FIG. 6, a pointer 23 is displayed at position P3 ($\alpha_3$=125°, computed based on a third measurement carried out after the second measurement of the sensor, simultaneously to the pointer 22 displayed at position P2. The thickness of the pointer 23 is larger than the thickness of the pointer P2 because the deviation between positions P1 and P2 ($\Delta P_1 = \alpha_2 - \alpha_1 = 10°$) is larger than the deviation between positions P2 and P3 ($\Delta P_2 = \alpha_3 - \alpha_2 = 5°$).

Both pointers 22, 23 are displayed simultaneously such as to provide a continuous and smooth display of the successive pointers. The driver of the vehicle feels that a trace is left behind the pointer as it moves. As can be seen in FIG. 6, the transparency of pointer 22 is higher than pointer 23 such that the last displayed pointer (here pointer 23) is more visible than the previous displays of pointers (here pointer 22). Preferably, not more than three successive positions of the pointer are displayed simultaneously.

In a fourth implementation of the method of the invention, the colour of the pointer is modified according to the deviation of the position with the last position of the displayed pointer. Therefore, the greater the deviation is, the more vivid the colour of the pointer. For example, the pointer is coloured in red for large deviations and in white for small deviations.

In a fifth implementation of the method of the invention, the outlines of the pointer are made blurred according to the deviation between two successive positions of the pointer. Therefore, the greater the deviation, the more blurred the outlines of the pointer. The contrast between the colour of the pointer and the colour of the display surface is lower as it gets closer to the outlines of the pointer. For large position deviations, the lower segment 225, the arc of circle 226 and the upper segment 227 are of the same colour as the display surface, namely black.

The blurred rendering is different from the transparency effect. Transparency is an overall feature which applies to the whole pointer, whether the centre or the outline thereof, whereas the blurred rendering applies to the outline of the pointer towards the centre thereof. The perception of effects is different, the blurred rendering of the pointer being preferred in order to "smoothen" the outlines of the pointer and make the speed perception easier.

Of course, any combination of modifications to the physical characteristics of the pointer (shape, colour, transparency, blurred rendering, contrast, brightness or shading) would also be appropriate. Of course as well, the modifications can be consistent or strengthened in the vicinity of the first and/or second positions of the pointer. Strengthening modifications at the various positions enables the movement of the pointer to be more visible and smoother. The different possible combinations allow a person skilled in the art to create indicators with "customised" pointers and enable pointers to be visibly displayed while maintaining a smooth perception of the movement of the latter, in spite of a low refreshing frequency (50 Hz-60 Hz).

Figure 7:
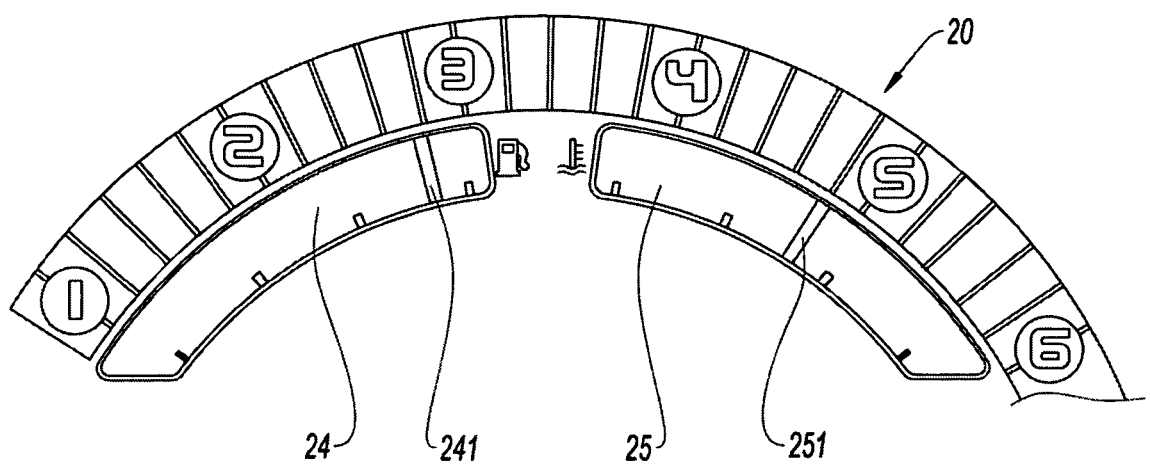
FIG. 7 shows a second embodiment of an indicator.

Referring to FIG. 7 showing a second embodiment of an indicator, the indicator 20 is shown in the form of two graduated disc portions 24, 25 respectively indicating the amounts of the fuel and coolant left in the vehicle. The pointers 241, 251, respectively belonging to the graduated disc portions 24, 25 are shown as rectangles. Of course, the modifications of the physical characteristics of the pointers should be carried out according to the shape of said pointers. This is the reason why, with rectangular pointers 241, 251, the increase of the thickness of pointers 241, 251 is carried out in the width of the pointer.

Figure 8:
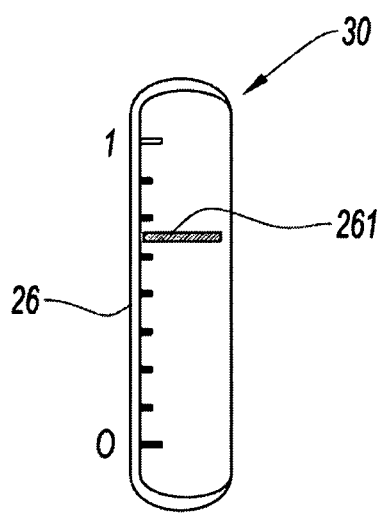
FIG. 8 shows a third embodiment of an indicator.

In the same way, referring to FIG. 8 showing a third embodiment of an indicator, the indicator 30, indicating the amount of fuel left in the vehicle, is shown in the form of an upright graduated line 25 wherein a horizontal rectangular pointer 261 moves.

Of course, a great number of indicator shapes could also be appropriate.

The invention claimed is:

1. A method for displaying a rotational pointer at radial positions on a display surface of a vehicle instrument panel, comprising:
   computing a first radial position of the pointer on the display surface according to a first measurement carried out by a sensor in the vehicle;
   displaying the pointer on the display surface at said first radial position;
   computing a second radial position of the pointer on the display surface according to a second measurement carried out by said sensor in the vehicle;
   displaying the pointer on the display surface at said second radial position;
   wherein the radial thickness of the pointer, when displayed at said second radial position, is increased relative to the radial thickness of the pointer, when displayed at the first radial position, proportionally according to a deviation between the first and second computed radial positions and smaller than a deviation between the first and second computed radial positions.

2. A method according to claim 1, wherein the pointer is displayed simultaneously at the first and second computed radial positions.

3. A method according to claim 1, wherein the physical characteristics of the pointer are modified in a consistent way.

4. A method according to claim 3, wherein the pointer has a uniform transparency when displayed at the second radial position.

5. An indicator for a vehicle instrument panel, comprising a display surface wherein a pointer is displayed according to the method to claim 1.

6. An indicator for a vehicle instrument panel according to claim 5, comprising a circular dial.

7. A method for displaying a pointer at positions on a display surface of a vehicle instrument panel, comprising:
   computing a first position of the pointer on the display surface according to a first measurement carried out by a sensor in the vehicle;
   displaying the pointer on the display surface at said first position;
   computing a second position of the pointer on the display surface according to a second measurement carried out by said sensor in the vehicle;
   display the pointer on the display surface at said second position;
   wherein the outlines of the pointer, when displayed at said second position, are made blurred relative to the outlines of the pointer, when displayed at the first position, according to a deviation between the first and second computed positions,
   wherein a radial thickness of the pointer, when displayed at said second position, is increased relative to the radial thickness of the pointer, when displayed at the first position, proportionally according to a deviation between the first and second computed positions and smaller than a deviation between the first and second computed positions.

* * * * *